No Printed Specification Available
1850X
W. H. Peabody.
Domestic Spinning.
Patented Dec. 14, 1812.
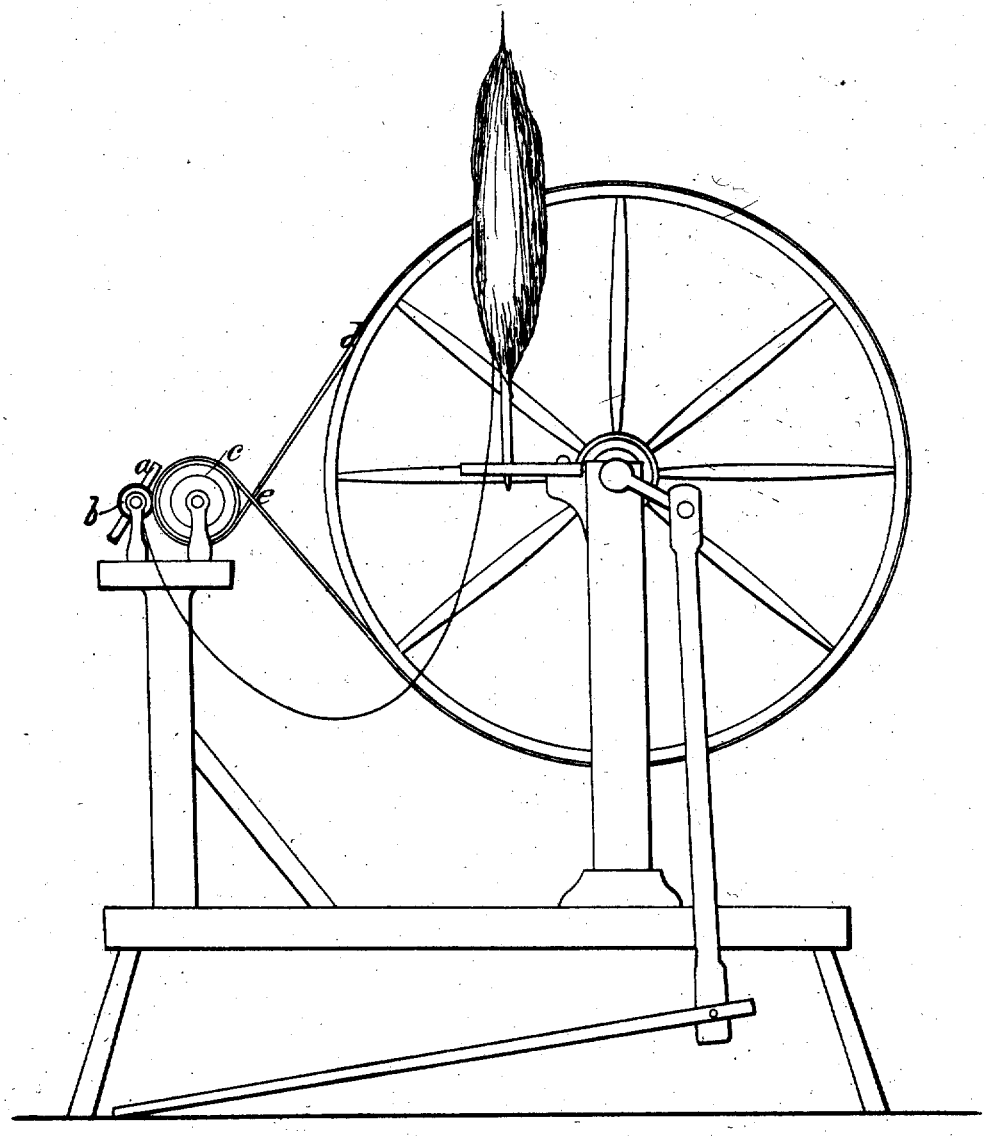

Dec. 14. 1842

1850X

William H. Peabody
Letters Patent

The schedule referred to in these Letters Patent and making part of the same containing a description in the words of the said William H. Peabody himself of his improvement in the construction of Wheel heads.

The whirl on the spindle very small with a large whirl between the spindle and the wheel and the band to cross between the wheel and the first whirl and also cross again between the first whirl and the whirl which turns the spindle. The great improvement in this construction compared with any other constructed wheel heads, is that the band crossing so near the whirl which turns the spindle it touches the surface of the spindle whirl nearly around consequently the spindle which may be made so small that turning of the spindle may be accelerated nearly one hundred fold compared with the usual constructed wheel heads and the band must be crossed twice that the spindle may turn the usual way.

Witnesses
Joseph D. Welton
Nathan Preston

Wm H. Peabody

[illegible] Drawing made (b) 1841.

Exd
[illegible]